US012630122B2

(12) United States Patent
Kim et al.

(10) Patent No.: US 12,630,122 B2
(45) Date of Patent: May 19, 2026

(54) ANTI-ICING STRUCTURE OF A CHARGING DOOR FOR A VEHICLE

(71) Applicants: HYUNDAI MOTOR COMPANY, Seoul (KR); KIA CORPORATION, Seoul (KR); SAMBO A&T CO., LTD., Sari-myeon (KR)

(72) Inventors: Jihun Kim, Hwaseong-si (KR); Hyungjin Park, Incheon (KR); Jin Ho Lee, Suwon-si (KR); Jinwoo Kim, Suwon-si (KR); Yeong Bae Park, Sari-myeon (KR)

(73) Assignees: HYUNDAI MOTOR COMPANY, Seoul (KR); KIA CORPORATION, Seoul (KR); SAMBO A&T CO., LTD., Sari-myeon (KR)

( * ) Notice: Subject to any disclaimer, the term of this patent is extended or adjusted under 35 U.S.C. 154(b) by 813 days.

(21) Appl. No.: 17/966,567

(22) Filed: Oct. 14, 2022

(65) Prior Publication Data

US 2023/0129663 A1 Apr. 27, 2023

(30) Foreign Application Priority Data

Oct. 21, 2021 (KR) ........................ 10-2021-0141313
May 24, 2022 (KR) ........................ 10-2022-0063226

(51) Int. Cl.
*B60S 1/66* (2006.01)
*B60K 15/05* (2006.01)
(Continued)

(52) U.S. Cl.
CPC ................ *B60S 1/66* (2013.01); *B60K 15/05* (2013.01); *H05B 3/06* (2013.01); *B60L 53/16* (2019.02)

(58) Field of Classification Search
CPC ... B60S 1/66; B60L 53/16; H05B 3/06; B60K 15/05
See application file for complete search history.

(56) References Cited

U.S. PATENT DOCUMENTS 10,899,243 B2 1/2021 Kang
11,654,772 B2 5/2023 Merryweather et al.
(Continued)

FOREIGN PATENT DOCUMENTS

CN 104002876 A 8/2014
CN 105896228 A * 8/2016 ........... H01R 43/002
(Continued)

OTHER PUBLICATIONS

KR_20190069721_Translation (Year: 2019).*

*Primary Examiner* — Woody A Lee, Jr.
(74) *Attorney, Agent, or Firm* — Lempia Summerfield Katz LLC

(57) ABSTRACT

An anti-icing structure is for a charging door for a vehicle where the charging door is rotatably installed to an inlet housing with a charging inlet module to selectively open the charging inlet module. The anti-icing structure includes: a door inner cover hingedly connected to the inlet housing through a hinge member at a position corresponding to an opening portion formed in the inlet housing to open the charging inlet module; a door outer cover connected to the outer surface of the door inner cover; and a heating assembly installed between an edge portion of the outer surface of the door inner cover and an edge portion of the inner side of the door outer cover.

17 Claims, 12 Drawing Sheets

(51) Int. Cl.
  *H05B 3/06*    (2006.01)
  *B60L 53/16*    (2019.01)

(56)      References Cited

U.S. PATENT DOCUMENTS

| | | | |
|---|---|---|---|
| 2002/0113455 A1* | 8/2002 | Mungia | G09F 21/045 |
| | | | 296/97.22 |
| 2010/0088934 A1* | 4/2010 | Mungia | G09F 21/04 |
| | | | 40/591 |
| 2010/0096377 A1* | 4/2010 | Zubrecki | B60L 1/02 |
| | | | 219/202 |
| 2019/0176635 A1 | 6/2019 | Kang | |
| 2020/0001721 A1 | 1/2020 | Merryweather et al. | |
| 2022/0372798 A1* | 11/2022 | Gröver | E05B 81/06 |
| 2023/0234447 A1 | 7/2023 | Merryweather et al. | |
| 2024/0018821 A1* | 1/2024 | Ha | H01R 13/5213 |

FOREIGN PATENT DOCUMENTS

| | | | | |
|---|---|---|---|---|
| DE | 1120180010181 | T5 | 11/2019 | |
| DE | 102019004019 | A1 * | 1/2020 | ............. B60L 53/30 |
| DE | 102019007175 | A1 * | 7/2020 | ............. B60L 53/30 |
| DE | 102021121085 | A1 | 2/2023 | |
| JP | 2016088250 | A | 5/2016 | |
| JP | 6417861 | B2 | 11/2018 | |
| JP | 6417862 | B2 | 11/2018 | |
| JP | 2018196258 | A | 12/2018 | |
| KR | 100930703 | B1 | 12/2009 | |
| KR | 20190069721 | A * | 6/2019 | ............. B60L 53/31 |
| KR | 20190070099 | A | 6/2019 | |
| KR | 20210106700 | A | 8/2021 | |

* cited by examiner

ANTI-ICING STRUCTURE OF A CHARGING DOOR FOR A VEHICLE

CROSS-REFERENCE TO RELATED APPLICATION

This application claims priority to and the benefit of Korean Patent Application No. 10-2021-0141313 filed in the Korean Intellectual Property Office on Oct. 21, 2021, and Korean Patent Application No. 10-2022-0063226 filed in the Korean Intellectual Property Office on May 24, 2022, the entire contents of which are incorporated herein by reference.

BACKGROUND OF THE DISCLOSURE

(a) Technical Field

The present disclosure relates to an electric vehicle. More particularly, the present disclosure relates to an anti-icing structure of a charging door for a vehicle that is configured to open and close a charging inlet of an electric vehicle.

(b) Description of the Related Art

Due to recently tightened environmental regulations and fuel efficiency regulations, the use of environment-friendly vehicles such as hybrid vehicles and electric vehicles is increasing. In the case of an environment-friendly vehicle, it is very important to secure the capacity or obtain a charged state of the high voltage battery because the vehicle is mainly driven by a motor instead of an engine. In the case of a hybrid vehicle, the high voltage battery is charged by driving the engine, whereas in the case of an electric vehicle, the high voltage battery is charged by an external power source.

For charging the high voltage battery, the electric vehicle is equipped with a charging inlet. When the charging connector connected to the external power supply is coupled to the charging inlet, electrical energy flows from the external power supply to the high voltage battery, charging the high voltage battery.

The charging inlet may be mounted on the front vehicle body, the rear vehicle body, or the side vehicle body depending on the type of vehicle. In one example, the charging inlet may be installed in the front bumper unit in the front vehicle body. The charging inlet is mounted on the inlet housing fixed to the front bumper cover, and the inlet housing may be opened and closed by or using the charging door.

The charging door is rotatably hinged to the inlet housing through the hinge structure and rotates by or via the hinge structure to open or close the charging inlet.

However, since the charging inlet is mounted at the front of the vehicle, when the vehicle is driving in winter, snow particles enter between the charging door and the parting line of the inlet housing and freeze. This may cause a defective opening of the charging door or prevent the charging door from opening.

The above information disclosed in this Background section is provided only to enhance understanding of the background of the disclosure Therefore, the Background section may contain information that does not form the prior art that is already known in this country to a person of ordinary skill in the art.

SUMMARY OF THE DISCLOSURE

The present disclosure has been made in an effort to provide an anti-icing structure of a charging door for a vehicle that allows a frozen body to be melted with heat in a gap (e.g., a parting line) between the inlet housing and the charging door during winter, severe cold, or heavy snow.

An anti-icing structure of a charging door for a vehicle is disclosed where the charging door is rotatably installed or mounted to an inlet housing with a charging inlet module to selectively open the charging inlet module. The anti-icing structure according to an embodiment of the present disclosure may include: a door inner cover hingedly connected to the inlet housing through a hinge member at a position corresponding to an opening portion formed in the inlet housing to open the charging inlet module; a door outer cover connected to the outer surface of the door inner cover; and a heating assembly installed between an edge portion of the outer surface of the door inner cover and an edge portion of the inner side of the door outer cover.

The heating assembly may include an insulation pad connected to the edge of the inner side of the door outer cover and a heated pad connected to the insulation pad at a position corresponding to the outer surface of the door inner cover.

The door inner cover and the door outer cover connected to each other may form a confined space between each edge portion.

The insulation pad and the heated pad connected to each other may be disposed in the confined space.

The door inner cover may include: a first edge surface formed on the edge portion of the inner side at a position corresponding to an opening edge face provided in the opening portion of the inlet housing; a second edge surface formed on the edge portion of the outer surface at a position corresponding to the first edge surface; and connecting ribs protruded on each edge of the second edge surface.

The door outer cover may include a third edge surface formed on the edge portion of the inner side at a position corresponding to the second edge surface.

The connecting rib may be connected to the third edge surface.

The heating assembly may include an insulation pad in the shape of a strip connected to the third edge surface and a heated pad in the shape of a strip attached to the insulation pad at a position corresponding to the second edge surface.

The insulation pad and the heated pad bonded to each other may be disposed between the connecting ribs.

An air gap may be formed between the heated pad and the second edge surface within the connecting ribs.

The anti-icing structure of a charging door according to an embodiment of the present disclosure may further include a sealing member secured to either the opening edge face or the first edge surface facing each other.

The sealing member may include a sealing strip attached to the opening edge face.

The sealing member may include a heat transfer pad adhered to the first edge surface to transfer heat emitted from the heated pad to the opening edge face.

The heated pad may be disposed to be spaced apart at predetermined intervals along the width direction and may include a plurality of hot wire patterns formed along the strip direction.

Each of the plurality of hot wire patterns may include a linear pattern and a waveform pattern connected to each other.

Each of the linear pattern and waveform pattern of the plurality of hot wire patterns may be formed with different section distances.

The door inner cover may further include a terminal insert portion formed on the inner side of the door inner cover and into which a terminal block electrically connected to the heated pad through a wire is fitted.

The connecting rib may be bonded to the third edge surface of the door outer cover by adhesive.

The anti-icing structure of a charging door according to an embodiment of the present disclosure may further include at least one air exhaust passage formed in the door inner cover and the door outer cover connected to each other.

At least one air exhaust passage may include an air exhaust hole formed in the connecting rib.

The heated pad may include a plurality of hot wire patterns disposed at predetermined intervals along the width direction and formed along the strip direction and a hot wire holding side connected to each end of the plurality of hot wire patterns respectively.

In embodiments of the present disclosure, in low temperature conditions such as winter, cold season, or heavy snow, heat energy from a heating source is emitted from the heated pad. Freezing or frozen material is quickly removed and an open defect (e.g., failure to open) of the charging door during or for charging may be prevented.

In addition, the effects that can be obtained or predicted due to embodiments of the present disclosure, are to be disclosed directly or implicitly in the detailed description of an embodiment of the present disclosure. In other words, various effects obtained or predicted according to embodiments of the present disclosure are disclosed hereinafter within the detailed description.

BRIEF DESCRIPTION OF THE DRAWINGS

Since these drawings are for reference in describing embodiments of the present disclosure, the technical idea of the present disclosure should not be construed as being limited to the accompanying drawings.

Figure 1:
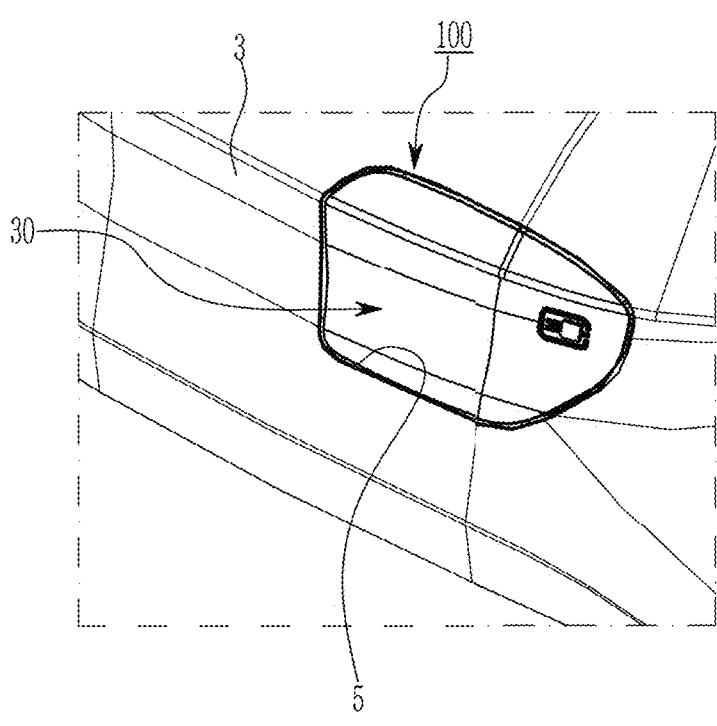
FIGS. 1 and 2 are drawings showing a charging door of a charging inlet assembly with an anti-icing structure applied to a charging door for a vehicle according to an embodiment of the present disclosure.

The drawings referenced above are not necessarily drawn to scale but should be understood as presenting rather simplified representations of various features, illustrating the basic principles of the present disclosure.

Certain design features of the present disclosure, including, for example, particular dimensions, directions, positions, and shapes will be determined in part by the particular intended application and environment of use.

DETAILED DESCRIPTION OF THE EMBODIMENTS

The present inventive concept is described more fully hereinafter with reference to the accompanying drawings, in which embodiments of the disclosure are shown.

As those of ordinary skill in the art should realize, the described embodiments may be modified in various different ways, all without departing from the spirit or scope of the present inventive concept.

In order to clearly explain the present inventive concept, parts irrelevant to the description are omitted, and the same reference numerals are assigned to the same or similar elements throughout the specification.

Since the size and thickness of each component shown in the drawing are arbitrarily indicated for convenience of explanation, the present disclosure is not necessarily limited to that shown in the drawing, and the thickness may be enlarged to clearly express various parts and areas.

In addition, in this specification, the names of the components are divided into first, second, etc., in order to classify the components in the same relationship. The order of the components is not necessarily limited in the following description.

In addition, terms such as . . . unit, . . . part, . . . member, and the like described in the specification mean a unit of a comprehensive configuration that performs at least one function or operation.

The terminology used in this specification is for the purpose of describing specific embodiments and is not intended to limit the present disclosure.

As used in this specification, the singular forms are also intended to include the plural forms, unless the context clearly indicates otherwise.

The terms 'comprises' and/or 'comprising' as used in this specification indicate the presence of specified features, integers, steps, operations, elements and/or components, but at least one other feature, integer, steps. It should also be understood that this does not exclude the presence or addition of groups, operations, components, and/or groups thereof.

As used herein, the term "and/or" includes any one or all combinations of the associated listed items. When a component, device, element, or the like of the present disclosure is described as having a purpose or performing an operation, function, or the like, the component, device, or element should be considered herein as being "configured to" meet that purpose or perform that operation or function.

As used in this specification, the term 'connected' denotes a physical relationship between two components in which the components are either directly connected to each other or indirectly connected through at least one intermediary component.

The terms 'vehicle', 'of the vehicle', 'car' or other similar terms used in this specification are generally passenger vehicles including sports cars, sport utility vehicles (SUVs), buses, trucks, vehicles including various commercial vehicles (passenger automobiles) and the like but are not limited thereto.

Hereinafter, embodiments of the present disclosure are described in detail with reference to the accompanying drawings.

Figure 2:
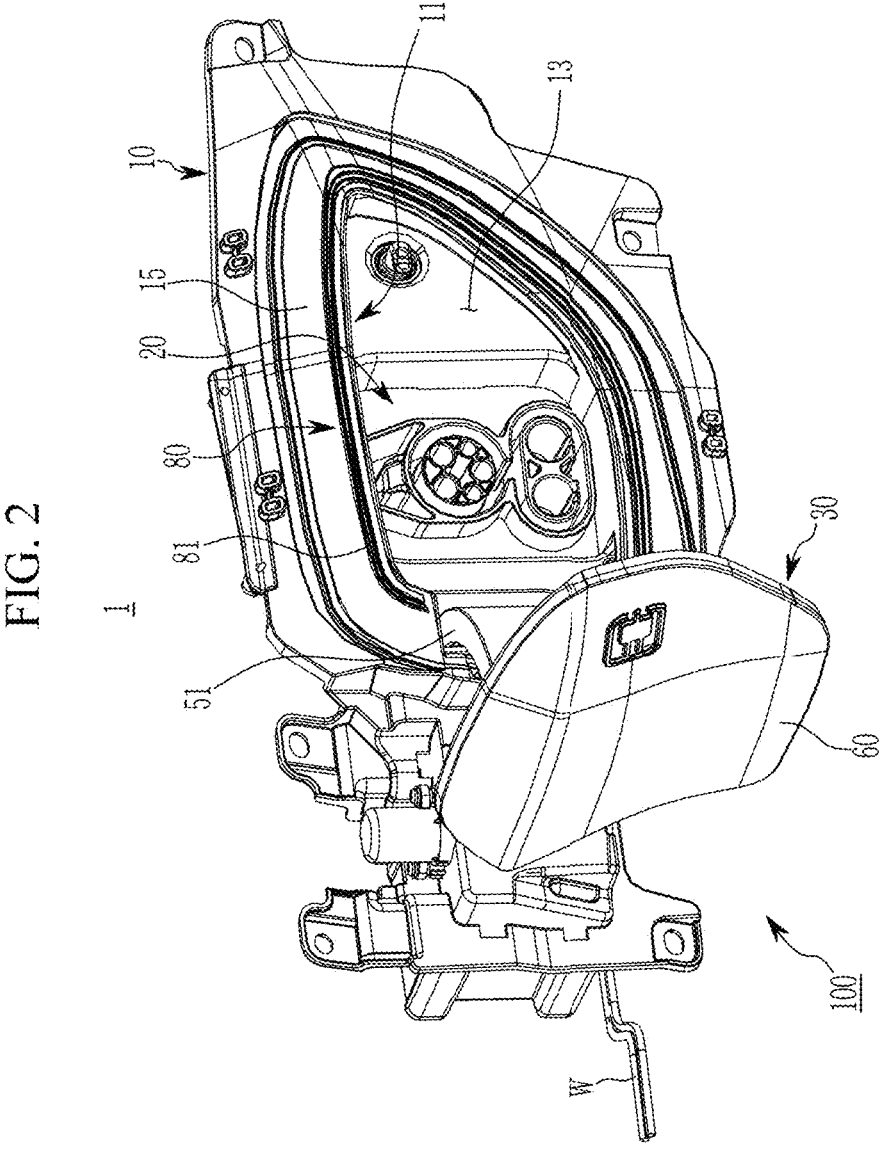

FIGS. 1 and 2 are drawings showing a charging door of a charging inlet assembly applied to or coupled to an anti-icing structure of or for a charging door for a vehicle according to an embodiment of the present disclosure.

Referring to FIGS. 1 and 2, an anti-icing structure 100 of a charging door for a vehicle according to an embodiment of the present disclosure may be applied to a charging inlet assembly 1 installed at a predetermined position of an electric vehicle.

The charging inlet assembly 1 is electrically connected to a high voltage battery (not shown) mounted on an electric vehicle.

The charging inlet assembly 1 may be coupled to the charging stand with an electrically connected charging connector (not shown) through a charging cable.

Therefore, when the charging connector is connected to the charging inlet assembly 1, electrical energy may be charged or supplied to the high voltage battery.

In one example, the charging inlet assembly 1 may be mounted on the front bumper cover 3 of the front bumper unit at the front of the electric vehicle.

However, the present disclosure is not limited thereto, and the charging inlet assembly 1 may be mounted on the rear or side of the electric vehicle.

Furthermore, the charging inlet assembly 1 may be mounted on various electric power moving means or devices.

The charging inlet assembly 1 may include an inlet housing 10, a charging inlet module 20, and a charging door 30.

The inlet housing 10 is connected to the rear face of the front bumper cover 3.

The inlet housing 10 includes an opening portion 11 connected to a mount hole 5 formed in the front bumper cover 3.

The opening portion 11 may include an opening 13 opened to the outside of the electric vehicle and an opening edge face 15 formed on an edge portion of the opening 13.

The opening edge face 15 is formed along the edge direction of opening 13 with a predetermined width.

The opening edge face 15 is opened to the outside of the electric vehicle through the mount hole 5 of the front bumper cover 3.

The charging inlet module 20 is configured to be electrically connected to the charging connector.

The charging inlet module 20 is fixed to the inlet housing 10.

The charging inlet module 20 is opened to the outside of the electric vehicle through the opening 13 of the inlet housing 10.

Further, the charging door 30 is configured to open or close the charging inlet module 20.

The charging door 30 is rotatably installed or connected to the inlet housing 10.

The anti-icing structure 100 of the charging door for a vehicle according to an embodiment of the present disclosure applied to the charging inlet assembly 1 as described above may melt the ice with heat in a gap (e.g., a parting line) between the opening edge face 15 of the inlet housing 10 and the charging door 30 during winter, severe cold, or heavy snow.

In this specification, the inner and inner side may be defined as the direction and surface facing the inside of the electric vehicle. The outer and outer side may be defined as the direction and surface facing the outside of the electric vehicle.

Figure 3:
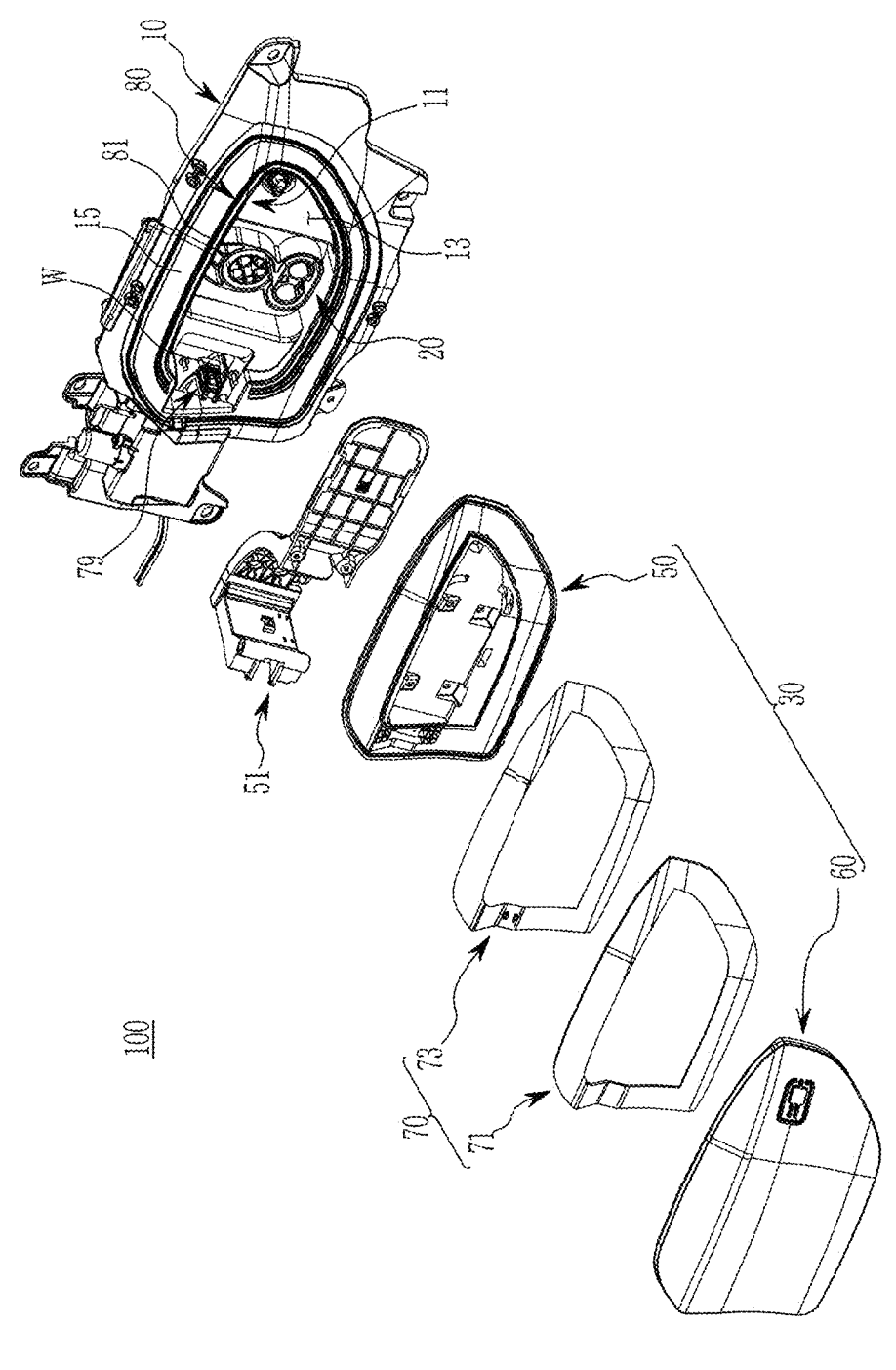
FIGS. 3 and 4 are exploded perspective views showing an anti-icing structure of a charging door for a vehicle according to an embodiment of the present disclosure.
Figure 4:
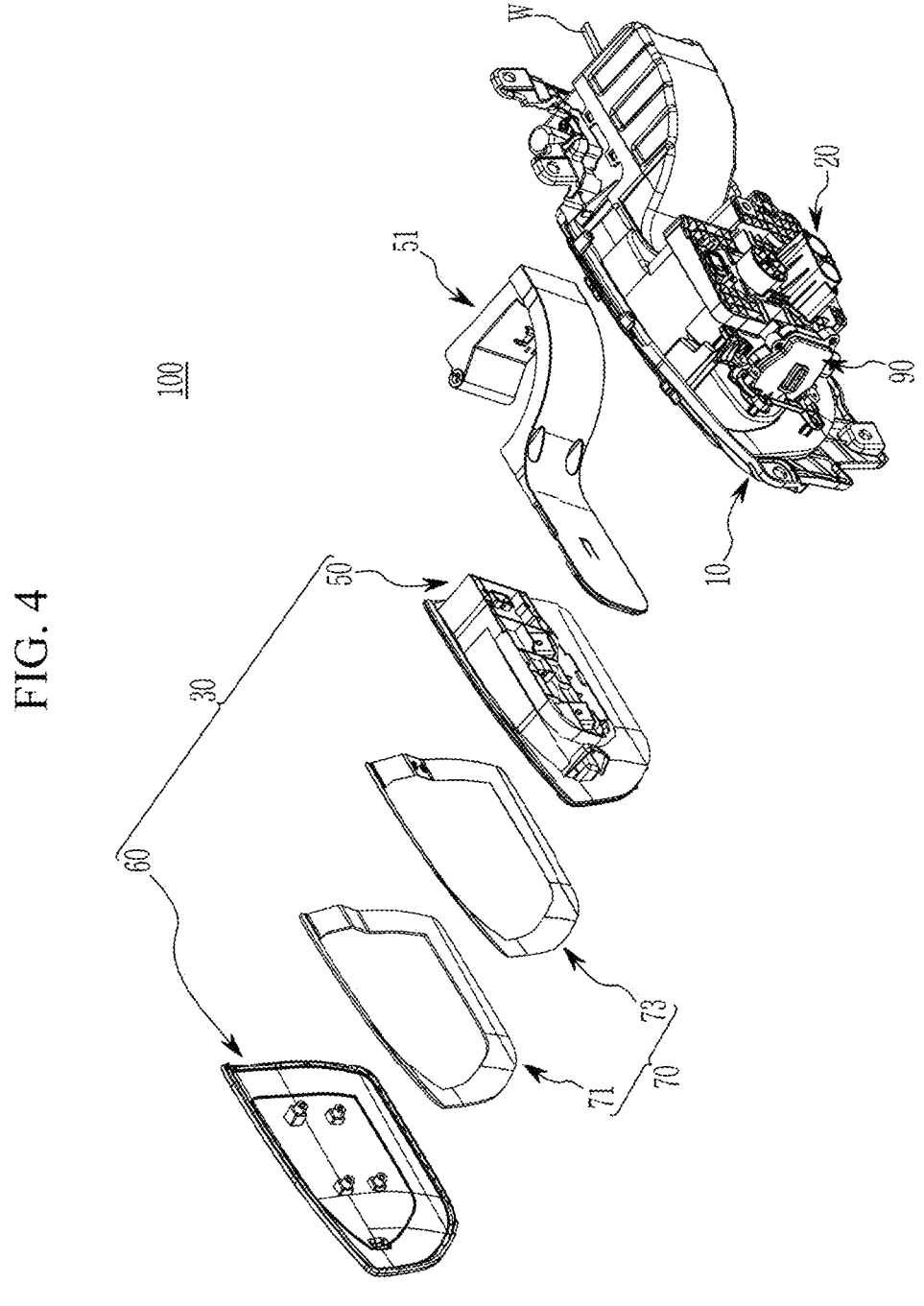

FIGS. 3 and 4 are exploded perspective views showing an anti-icing structure of a charging door for a vehicle according to an embodiment of the present disclosure.

Figure 5:
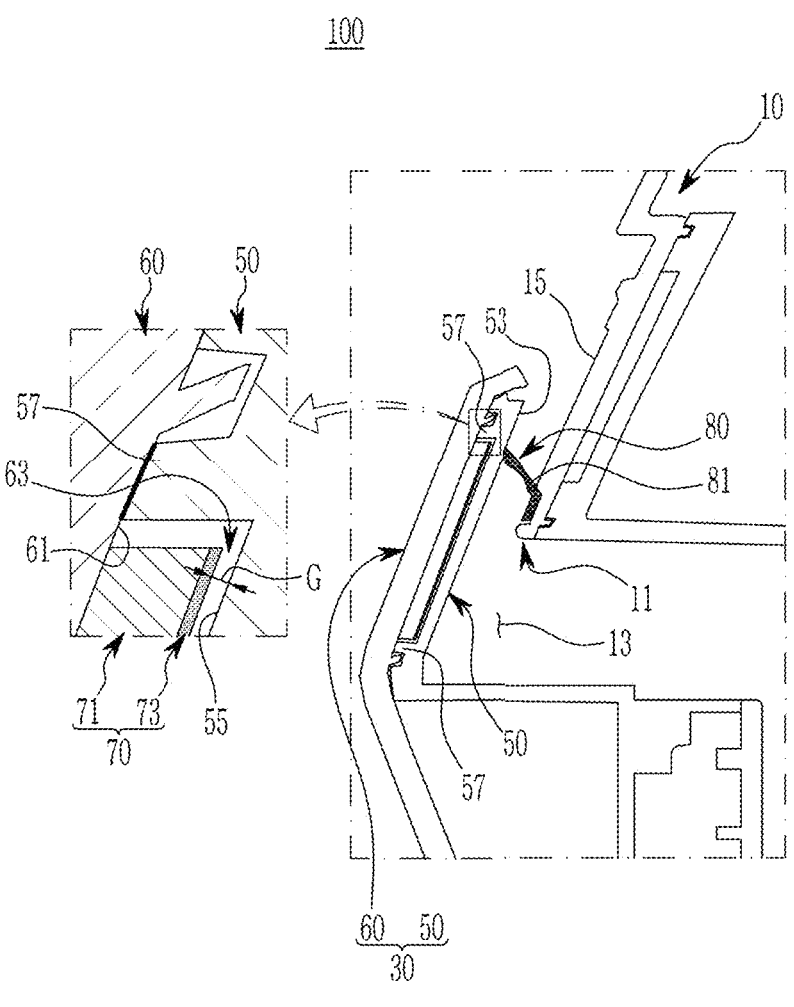
FIG. 5 is a cross-sectional view showing an anti-icing structure of a charging door for a vehicle according to an embodiment of the present disclosure.
Figure 6A:
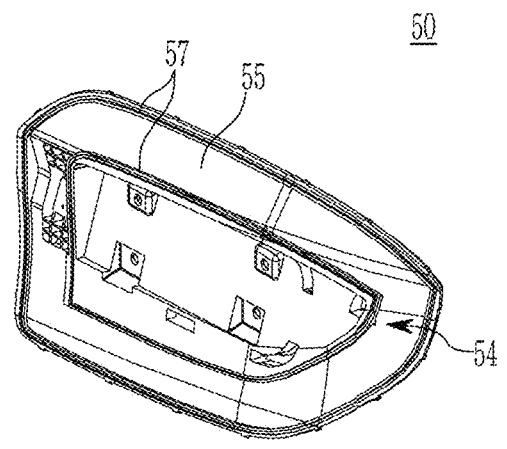
FIGS. 6A and 6B are drawings showing a door inner cover applied to an anti-icing structure of a charging door for a vehicle according to an embodiment of the present disclosure.
Figure 6B:
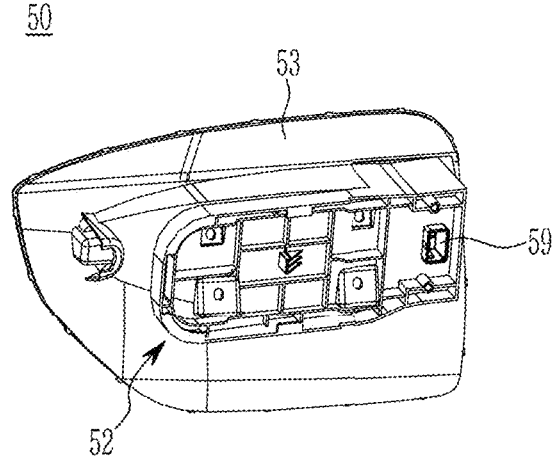

FIG. 5 is a cross-sectional view showing an anti-icing structure of a charging door for a vehicle according to an embodiment of the present disclosure. FIGS. 6A and 6B are drawings showing a door inner cover applied to an anti-icing structure of a charging door for a vehicle according to an embodiment of the present disclosure.

Referring to FIGS. 3-6B, the anti-icing structure 100 of the charging door for a vehicle according to an embodiment of the present disclosure may include a door inner cover 50, a door outer cover 60, a heating assembly 70, and a sealing member 80.

In an embodiment of the present disclosure, the door inner cover 50 is rotatably installed in the inlet housing 10 at a position corresponding to the opening 11 of the inlet housing 10.

The door inner cover 50 is hinged to the inlet housing 10 through or via a hinge member 51.

In one example, the hinge member 51 may be provided as a hinge block of a gooseneck type known to a person of an ordinary skill in the art.

The hinge member 51 is fixed to an inner side 52 of the door inner cover 50.

The door inner cover 50, as shown in FIGS. 6A and 6B, includes a first edge surface 53, a second edge surface 55, and connecting ribs 57.

The first edge surface 53 is formed on the edge portion of the inner side 52 of the door inner cover 50 in a position corresponding to the opening edge face 15 of the opening portion 11 of the inlet housing 10.

The first edge surface 53 is formed along the edge direction of the inner side 52 of the door inner cover 50 with a predetermined width.

The second edge surface 55 is provided as a surface opposite to the first edge surface 53 and is formed on the edge portion of an outer surface 54 of the door inner cover 50 at a position corresponding to the first edge surface 53.

The second edge surface 55 is formed along the edge direction on the outer surface 54 of the door inner cover 50 with a predetermined width.

Further, the connecting ribs 57 are formed to be protrude at both edges of the second edge surface 55, respectively.

In one example, the connecting rib 57 are formed protrude to the outside of the electric vehicle along one edge (e.g., outer edge) and the other edge (e.g., inner edge) of the second edge surface 55.

Figure 7:
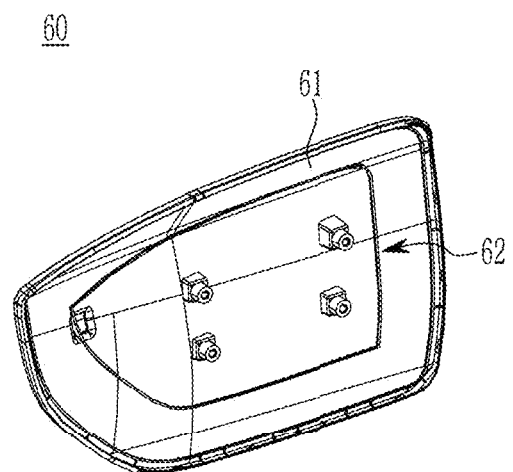
FIG. 7 is a drawing showing a door outer cover applied to an anti-icing structure of a charging door for a vehicle according to an embodiment of the present disclosure.

FIG. 7 is a drawing showing a door outer cover applied to an anti-icing structure of a charging door for a vehicle according to an embodiment of the present disclosure.

In an embodiment of the present disclosure, the door outer cover 60 is connected to the outer surface 54 of the door inner cover 50.

The door outer cover 60 includes a third edge surface 61.

The third edge surface 61 is formed on an edge portion of the inner side 62 of the door outer cover 60 at a position corresponding to the second edge surface 55 of the door inner cover 50.

The third edge surface 61 is formed along the edge direction on the inner side 62 of the door outer cover 60 with a predetermined width.

Here, the connecting rib 57 as described above may be connected to the third edge surface 61 of the door outer cover 60.

In one example, the connecting rib 57 may be bonded to the third edge surface 61 of the door outer cover 60 by adhesive.

However, the present disclosure is not limited thereto, and the connecting rib 57 may be fusion-bonded to the third edge surface 61 of the door outer cover 60 by laser.

Referring to FIG. 5, as the connecting rib 57 is connected to the third edge surface 61 as described above, a closed space 63 having a set cross-sectional area may be formed between the second edge surface 55 and the third edge surface 61.

In an embodiment of the present disclosure, the heating assembly 70 is configured to generate thermal energy by electrical resistance using received external power.

Then, the heating assembly 70 radiates heat energy between the first edge surface 53 of the door inner cover 50 and the opening edge face 15 of the opening portion 11 of the inlet housing 10.

The heating assembly 70 is located at a position corresponding to the opening 11 of the inlet housing 10, between the second edge surface 55 of the door inner cover 50 and the third edge surface 61 of the door outer cover 60.

Here, the heating assembly 70 may be disposed in the confined space 63 mentioned above.

The heating assembly 70 includes an insulation pad 71 and a heated pad 73.

The insulation pad 71 may be formed of an organic or inorganic insulating material known to a person of ordinary skill in the art.

In one example, the insulation pad 71 is provided in a strip shape or band shape and may be adhered to the third edge surface 61 of the door outer cover 60.

In addition, the heated pad 73 is a heating source that generates thermal energy by electrical resistance using the received external power and may be provided in a band shape.

The heated pad 73 may be adhered to the insulation pad 71 at a position corresponding to the second edge surface 55 of the door inner cover 50.

The insulation pad 71 and the heated pad 73 connected to each other as described above may be disposed between the connecting ribs 57 in the confined space 63 mentioned above.

In the confined space 63, an air gap G may be formed between the heated pad 73 and the second edge surface 55 of the door inner cover 50 in the connecting ribs 57.

The air gap G is formed by partitioned spaces in confined spaces 63.

Here, the air in the gap space may be heated by thermal energy emitted from the heated pad 73.

Figure 8:
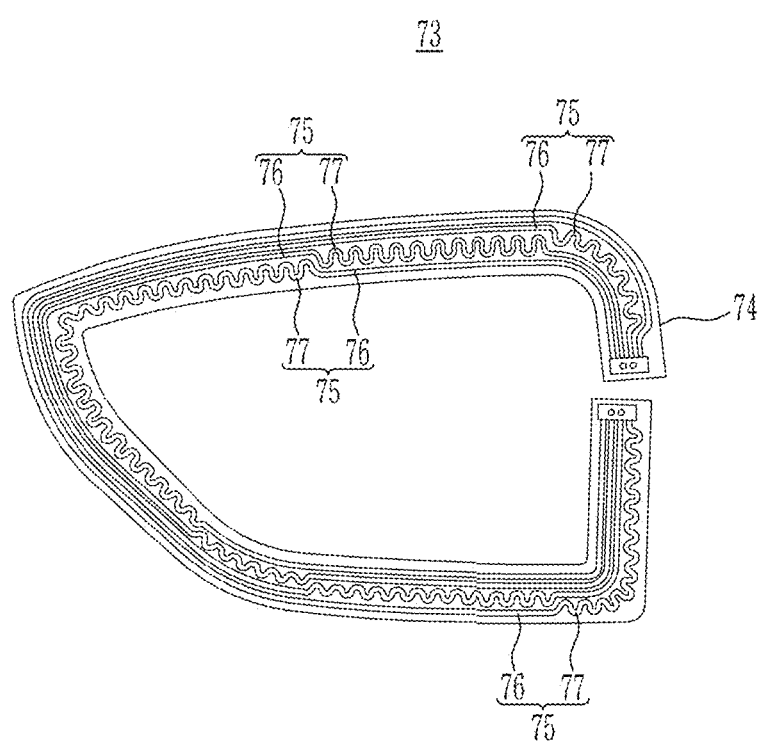
FIG. 8 is a drawing showing a heated pad of a heating assembly applied to an anti-icing structure of a charging door for a vehicle according to an embodiment of the present disclosure.

FIG. 8 is a drawing showing a heated pad of a heating assembly applied to an anti-icing structure of a charging door for a vehicle according to an embodiment of the present disclosure.

As shown in FIG. 8, according to an embodiment of the present disclosure the heated pad 73 includes a plurality of hot wire patterns 75 formed on the pad base 74.

The plurality of hot wire patterns 75 are disposed to be spaced apart from each other at predetermined intervals along the width direction of the pad base 74 and are formed along the strip direction (band direction) of the pad base 74.

Each of these a plurality of hot wire patterns 75 includes a linear pattern 76 and a waveform pattern 77 connected to each other.

The linear pattern 76 may be defined as a pattern formed in a line shape along the band direction (strip direction) of the pad base 74. The waveform pattern 77 may be defined as a pattern formed to be curved in a waveform along the band direction of the pad base 74.

Furthermore, each of the linear pattern 76 and the waveform pattern 77 of the plurality of hot wire patterns 75 may be formed with different section distances.

In this way, by setting the section distances of the linear pattern 76 and waveform pattern 77 differently, the heating area of a plurality of hot wire patterns 75 within the area of the heated pad 73 may be increased, and a certain amount of heat may be emitted within the heating area of a plurality of hot wire patterns 75.

The heated pad 73 according to an embodiment of the present disclosure is electrically connected to an external power source through a wire W.

The heated pad 73 may be electrically connected to an external power source through the terminal block 79 combined with wire W.

According to an embodiment of the present disclosure, as shown in FIG. 6B, a terminal insert portion 59 is formed on the inner side of the door inner cover 50.

The terminal insert portion 59 may be fitted with the terminal block 79.

Referring to FIG. 5, in an embodiment of the present disclosure, the sealing member 80 is adapted or configured to seal between the opening edge face 15 of the opening portion 11 of the inlet housing 10 and the first edge surface 53 of the door inner cover 50 facing each other.

The sealing member 80 may prevent snow particles or water from flowing into the charging inlet module 20.

The sealing member 80 is fixed to either the opening edge face 15 or the first edge surface 53 opposite each other.

In one example, the sealing member 80 may include a sealing strip 81 that is adhered along the edge direction to the opening edge face 15.

The sealing strip 81 may be provided with a weather strip of rubber material known to a person of ordinary skill in the art.

The sealing strip 81 may include seals designed to block snow particles and water.

Drawing reference numeral 90 not described in FIG. 4 denotes an opener configured to open the charging door 30 of the charging inlet assembly 1 by operating a button inside the electric vehicle.

Hereinafter, referring to FIGS. 1-8, the operation of the anti-icing structure 100 of the charging door for a vehicle according to an embodiment of the present disclosure configured as described above is described in detail.

The charging inlet assembly 1 is mounted on the electric vehicle, for example on the front bumper cover 3 on the front of the vehicle.

Generally, the charging door 30 of the charging inlet assembly 1 is closing or covering the charging inlet module 20 while closing or covering the opening portion 11 of the inlet housing 10.

Since the sealing strip 81 seals the gap between charging door 30 and the opening portion 11 of the inlet housing 10, the sealing strip 81 connected to the charging inlet module 20 may block snow particles and water while the electric vehicle is driving.

Furthermore, since the sealing strip 81 is fixed to the opening edge face 15 of the opening portion 11, it is possible to seal the gap between the opening edge face 15 and the first edge surface 53 of the door inner cover 50.

In this state, in order to charge external power to the high voltage battery of the electric vehicle, the charging door 30 is rotated by operating a button in the electric vehicle.

Then, the charging door 30 opens the charging inlet module 20 to the outside of the electric vehicle through the opening portion 11 of the inlet housing 10.

Here, the charging door 30 may be rotated through a push button or an actuating type opener 90 known to a person of ordinary skill in the art.

The charging door 30 may open the opening portion 11 of the inlet housing 10 while rotating around the hinge point of the inlet housing 10 through the hinge member 51.

Therefore, when the charging connector (not shown) is coupled to the charging inlet module 20, electrical energy can be charged to the high voltage battery.

On the other hand, when the electric vehicle is operated under low temperature conditions such as winter, cold season or heavy snow, snow particles or water inflow into the gap between the opening edge face 15 of the inlet housing 10 and the first edge surface 53 of the door inner cover 50 may be frozen.

In such a low temperature condition, electric power is applied to the heated pad 73 of the heating assembly 70 through a controller (not shown) known to a person of ordinary skill in the art.

In one example, the controller may apply electric power to the heated pad 73 when it is determined that the external temperature is lower than the predetermined temperature according to the detection signal received through the external temperature sensor.

Then, electric power is applied to a plurality of hot wire patterns 75 of the heated pad 73.

Accordingly, the heated pad 73 generates thermal energy by electrical resistance.

The insulation pad 71 adhered to the heated pad 73 may block the transfer of this heat energy to the door outer cover 60.

Accordingly, the thermal energy is emitted between the first edge surface 53 of the door inner cover 50 and the opening edge face 15 of the opening portion 11 of the inlet housing 10 through the second edge surface 55 of the door inner cover 50.

Here, the connecting rib 57 of the door inner cover 50 is joined to the third edge surface 61 of the door outer cover 60.

Accordingly, the insulation pad 71 and the heated pad 73 bonded to each other are positioned in a confined space 63 formed between the second edge surface 55 of the door inner cover 50 and the third edge surface 61 of the door outer cover 60 within the connecting ribs 57.

Further, the air gap G is formed between the connecting ribs 57 and between the heated pad 73 and the second edge surface 55 of the door inner cover 50 in the confined space 63.

Therefore, the air present in the air gap G is heated by the thermal energy emitted from the heated pad 73.

In this case, the thermal energy can be easily transferred between the first edge surface 53 of the door inner cover 50 and the opening edge face 15 of the opening portion 11 of the inlet housing 10 through the second edge surface 55 of the door inner cover 50.

In addition, the air present in the air gap G is maintained in a heated state by the thermal energy emitted from the heated pad 73.

Accordingly, even if the power applied to the heated pad 73 is turned off, thermal energy may be transferred between the first edge surface 53 of the door inner cover 50 and the opening edge face 15 of the opening portion 11 of the inlet housing 10.

Furthermore, the heated pad 73 forms a predetermined linear pattern 76 and a waveform pattern 77 with different section distances in each of a plurality of hot wire patterns 75.

Due to this, the heating area of the plurality of hot wire patterns 75 is increased within the set area, and a constant amount of heat may be emitted within the heating area of the plurality of hot wire patterns 75.

Accordingly, the anti-icing structure 100 of the charging door for a vehicle according to an embodiment of the present disclosure may increase the thermal performance of thermal energy transferred between the first edge surface 53 of the door inner cover 50 and the opening edge face 15 of the opening portion 11 of the inlet housing 10.

As the thermal energy generated from the heated pad 73 is transferred between the first edge surface 53 and the opening edge face 15 as described above, the ice in the gap between the first edge surface 53 and the opening edge face 15 is melted by the thermal energy.

Accordingly, the anti-icing structure 100 of the charging door for a vehicle according to an embodiment of the present disclosure may melt the ice in the gap between the first edge surface 53 and the opening edge face 15, thus the charging door 30 can be opened smoothly or reliably for charging.

The anti-icing structure 100 of the charging door for a vehicle according to an embodiment of the present disclosure as described so far may apply thermal energy between the inlet housing 10 and the charging door 30 through the heating assembly 70 and may remove a frozen body (e.g., ice, snow, or the like) between the inlet housing 10 and the charging door 30.

Accordingly, the anti-icing structure 100 of the charging door for a vehicle according to an embodiment of the present disclosure may remove the ice between the inlet housing 10 and the charging door 30 within a short time by the thermal energy emitted from the heated pad 73 in low temperature conditions such as winter, cold season, or heavy snow and thus may prevent malfunction of the charging door 30 opening for charging.

Figure 9:
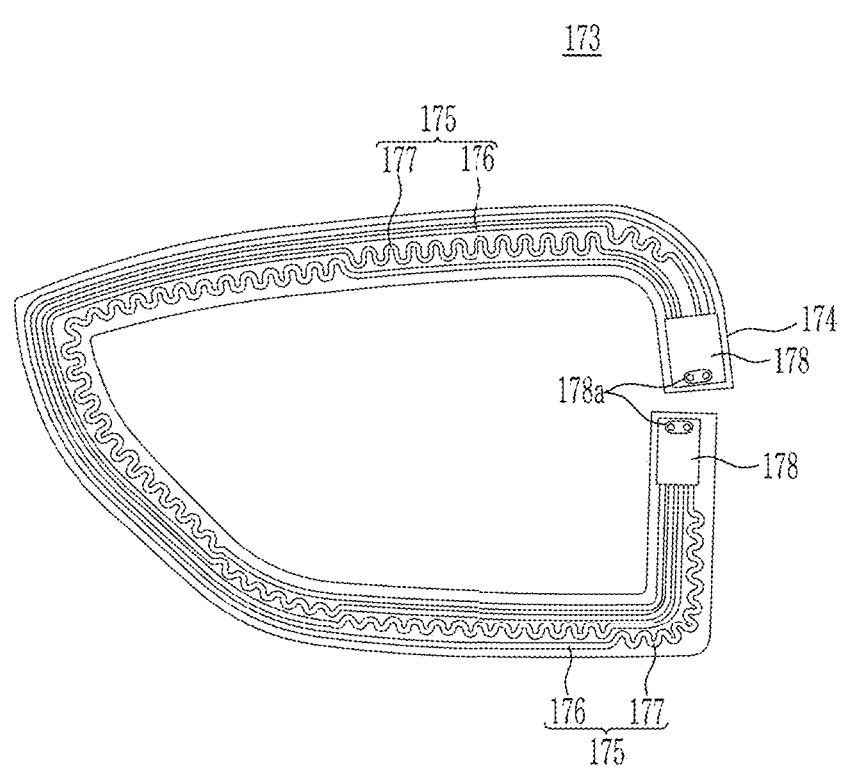
FIG. 9 is a drawing showing a variation of a heated pad of a heating assembly applied to an anti-icing structure of a charging door for a vehicle according to an embodiment of the present disclosure.

FIG. 9 is a drawing showing a variation of a heated pad of a heating assembly applied to an anti-icing structure of a charging door for a vehicle according to an embodiment of the present disclosure.

Referring to FIG. 9, the heated pad 173 according to an embodiment includes a plurality of hot wire patterns 175 as described above.

In addition, the heated pad 173 further includes a hot wire holding side 178 connected to each end of a plurality of hot wire patterns 175 respectively.

The plurality of hot wire patterns 175 are disposed to be spaced apart from each other at predetermined intervals along the width direction of the pad base 174 and are formed along the strip direction (band direction) of the pad base 174.

Each of the plurality of hot wire patterns 175 includes a linear pattern 176 and a waveform pattern 177 connected to each other.

In this embodiment, the hot wire holding side 178 is connected to both ends of a plurality of hot wire patterns 175 in a planar form of a predetermined area, respectively.

The hot wire holding side 178 may be electrically connected to a power supply unit 178a (e.g., a rivet connector).

Therefore, the power supply unit 178a may not be connected to both ends of the plurality of hot wire patterns 175. However, the power supply unit 178a may be coupled to the hot wire holding side 178 respectively connected to both ends of the plurality of hot wire patterns 175.

Accordingly, in this embodiment, it is possible to prevent the short circuit of the pattern due to the damage of a plurality of hot wire patterns 175 when the power supply unit 178a is overloaded or the power supply unit 178a is assembled.

Figure 10:
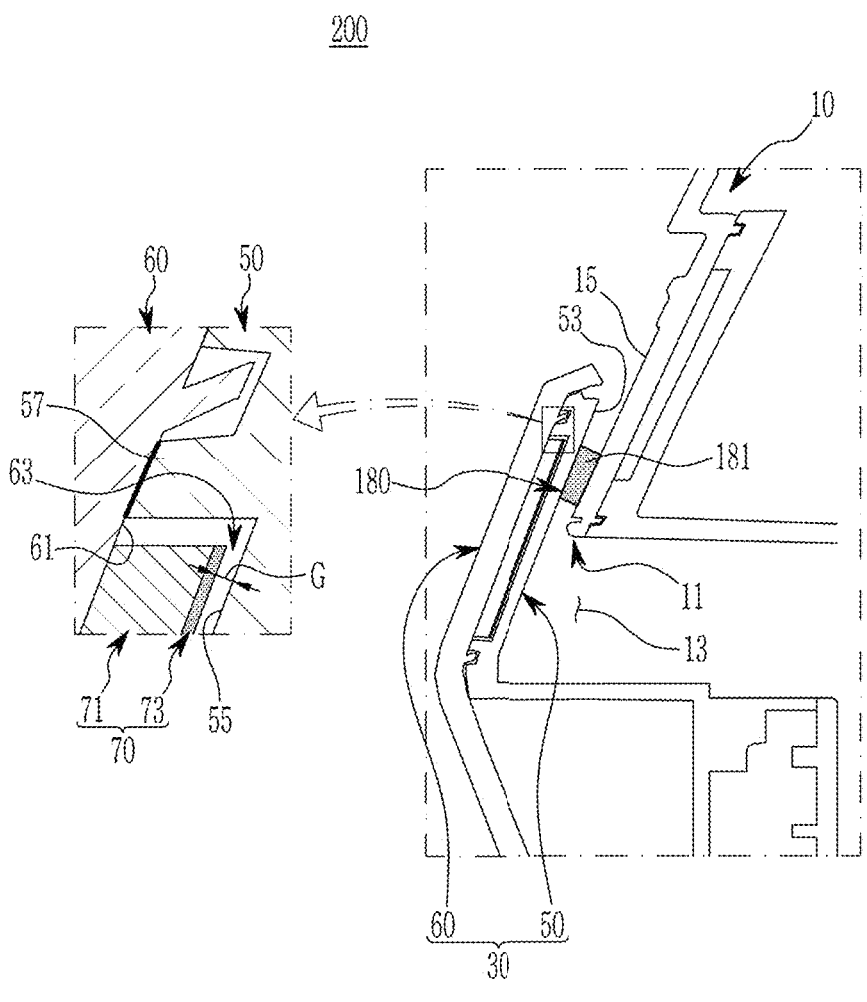
FIG. 10 is a cross-sectional view showing an anti-icing structure of a charging door for a vehicle according to another embodiment of the present disclosure.

FIG. 10 is a cross-sectional view showing an anti-icing structure of a charging door for a vehicle according to another embodiment of the present disclosure.

In the drawing, the same drawing reference numerals are given to the embodiment and the same configuration described above.

Referring to FIG. 10, an anti-icing structure 200 of the charging door for a vehicle according to another embodiment of the present disclosure may include a sealing member 180 having a heat transfer pad 181 while based on the structure of the embodiment described above.

In an embodiment of the present disclosure, the heat transfer pad 181 seals between the opening edge face 15 of the opening portion 11 of the inlet housing 10 and the first edge surface 53 of the door inner cover 50, as in the previous embodiment. The heat transfer pad 181 is designed to prevent snow particles or water from flowing into the charging inlet module 20.

Furthermore, the heat transfer pad 181 may easily transfer the heat energy generated by the heated pad 73 to the opening edge face 15 of the opening portion 11 of the inlet housing 10 through the first edge surface 53 of the door inner cover 50.

The heat transfer pad 181 is adhered to the first edge surface 53 of the door inner cover 50 and is in close contact with the opening edge face 15 of the opening portion 11 of the inlet housing 10.

In one example, the heat transfer pad 181 may be provided as a heat transfer medium of a silicone rubber material known to a person of ordinary skill in the art.

In the anti-icing structure 200 of the charging door for a vehicle according to another embodiment of the present disclosure, the heat energy generated from the heated pad 73 can be transmitted easily to the opening edge face 15 of the opening portion 11 of the inlet housing 10 through the heat transfer pad 181.

Accordingly, in the anti-icing structure 200 of the charging door for a vehicle according to another embodiment of the present disclosure, as the heat transfer efficiency is increased by the heat transfer pad 181, it is possible to further improve the defrosting efficiency of the ice between the inlet housing 10 and the charging door 30.

Since the remaining configuration and effect of the anti-icing structure 200 of the vehicle charging door according to the present disclosure as described above are the same as in the above-described embodiments, a detailed description thereof has been omitted.

Figure 11:
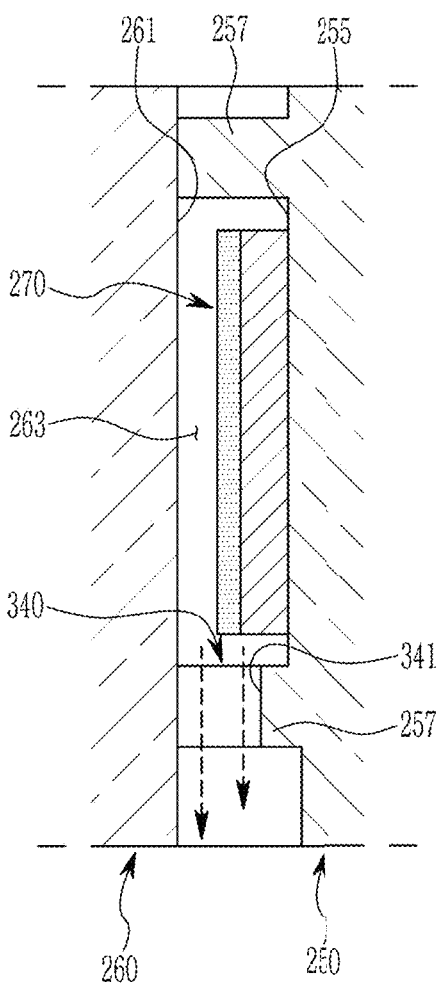
FIG. 11 is a cross-sectional view showing an anti-icing structure of a charging door for a vehicle according to another embodiment of the present disclosure.
Figure 12:
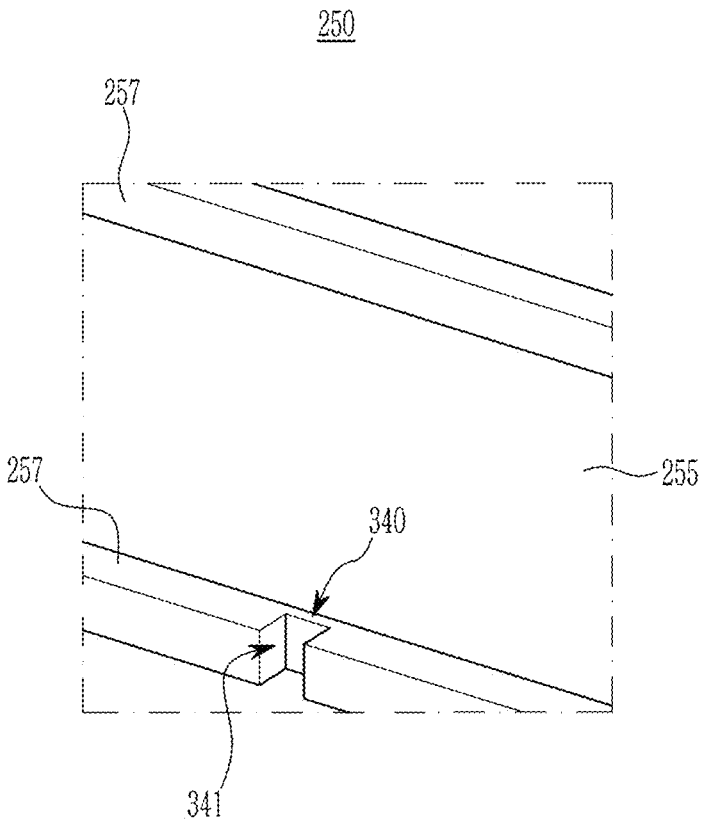
FIG. 12 is a drawing showing a part of the door inner cover applied to the anti-icing structure of the charging door for a vehicle according to another embodiment of the present disclosure.

FIG. 11 is a cross-sectional view showing an anti-icing structure of a charging door for a vehicle according to another embodiment of the present disclosure. FIG. 12 is a drawing showing a part of the door inner cover applied to the anti-icing structure of the charging door for a vehicle according to another embodiment of the present disclosure.

Referring to FIGS. 11 and 12, an anti-icing structure 300 of the charging door for a vehicle according to another embodiment of the present disclosure may include at least one air exhaust passage 340 formed in a door inner cover 250 and a door outer cover 260 connected to each other.

In an embodiment of the present disclosure, the at least one air exhaust passage 340 is connected to the space 263 formed between the second edge surface 255 of the door inner cover 250 and the third edge surface 261 of the door outer cover 260.

Here, the heating assembly 270 as in the above-described embodiments, may be disposed in the above-described space 263.

Further, the at least one air exhaust passage 340 may be connected to the outside of the space 263.

Further, the at least one air exhaust passage 340 according to an embodiment of the present disclosure includes an air exhaust hole 341 formed in the connecting rib 257 of the door inner cover 250.

The air exhaust hole 341 may be formed in the connecting rib 257 positioned on one edge (e.g., outer edge end) of the second edge surface 255 and/or the connecting rib 257 positioned on the other edge (e.g., inner edge end) of the second edge surface 255.

In one example, the air exhaust hole 341 may be formed in the connecting rib 257 positioned at the other edge of the second edge surface 255.

The air exhaust hole 341 may be formed as at least one air exhaust passage 340 by the third edge surface 261 of the door outer cover 260 that is joined to the connecting rib 257.

Accordingly, the heating assembly 270 radiates heat energy in the space 263 between the second edge surface 255 and the third edge surface 261.

Then, air heated by thermal energy (e.g., heated air) is exhausted to the outside of the space 263 through at least one air exhaust passage 340.

Accordingly, the anti-icing structure 300 of the charging door for a vehicle according to another embodiment of the present disclosure is configured to prevent damage to the door inner cover 250 and the door outer cover 260 by the expansion pressure of the air heated in the space 263.

The remaining configuration and operational effects of the anti-icing structure 300 of the charging door for a vehicle according to another embodiment of the present disclosure, as described above, are the same as in the embodiments described above, and thus a detailed description thereof is omitted.

While the inventive concept of the present disclosure has been described in connection with what is presently considered to be practical embodiments, it is to be understood that the inventive concept is not limited to the disclosed embodiments. On the contrary, it is intended to cover various modifications and equivalent arrangements included within the spirit and scope of the appended claims.

DESCRIPTION OF SYMBOLS

| | |
|---|---|
| 1: charging inlet assembly | 3: front bumper cover |
| 5: mount hole | 10: inlet housing |
| 11: opening portion | 13: opening |
| 15: opening edge face | 20: charging inlet module |
| 30: charging door | 50, 250: door inner cover |
| 51: hinge member | 53: first edge surface |
| 52, 62: inner side | 54: outer side |
| 55, 255: second edge surface | 57, 257: connecting rib |
| 59: terminal insert portion | 60, 260: door outer cover |
| 61, 261: third edge surface | 63: confined space |
| 70, 270: heating assembly | 71: insulation pad |
| 73, 173: heated pad | 74, 174: pad base |
| 75, 175: hot wire pattern | 76, 176: linear pattern |
| 77, 177: waveform pattern | 79: terminal block |
| 80, 180: sealing member | 81: sealing strip |
| 90: opener | G: air gap |
| W: wire | |

-continued

| | |
|---|---|
| 100, 200, 300: anti-icing structure | |
| 178: hot wire holding side | 178a: power supply unit |
| 181: heat transfer pad | 263: space |
| 340: air exhaust passage | 341: air exhaust hole |

What is claimed is:

1. An anti-icing structure of a charging door for a vehicle, the charging door being rotatably installed to an inlet housing with a charging inlet module to selectively open the charging inlet module, the anti-icing structure comprising:

a door inner cover hingedly connected to the inlet housing through a hinge member at a position corresponding to an opening portion formed in the inlet housing to open the charging inlet module;

a door outer cover connected to the outer surface of the door inner cover; and a heating assembly installed between an edge portion of the outer surface of the door inner cover and an edge portion of the inner side of the door outer cover, wherein the heating assembly comprises an insulation pad connected to the edge of the inner side of the door outer cover, and a heated pad connected to the insulation pad at a position corresponding to the outer surface of the door inner cover.

2. The anti-icing structure of claim 1, wherein:

the door inner cover and the door outer cover connected to each other form a confined space between each edge portion; and the insulation pad and the heated pad connected to each other are disposed in the confined space.

3. An anti-icing structure of a charging door for a vehicle, the charging door being rotatably installed to an inlet housing with a charging inlet module to selectively open the charging inlet module, the anti-icing structure comprising:

a door inner cover hingedly connected to the inlet housing through a hinge member at a position corresponding to an opening portion formed in the inlet housing to open the charging inlet module;

a door outer cover connected to the outer surface of the door inner cover; and a heating assembly installed between an edge portion of the outer surface of the door inner cover and an edge portion of the inner side of the door outer cover, wherein the door inner cover comprises a first edge surface formed on the edge portion of the inner side at a position corresponding to an opening edge face provided in the opening portion of the inlet housing, a second edge surface formed on the edge portion of the outer surface at a position corresponding to the first edge surface, and connecting ribs protruded on each edge of the second edge surface.

4. The anti-icing structure of claim 3, wherein:

the door outer cover includes a third edge surface formed on the edge portion of the inner side at a position corresponding to the second edge surface; and the connecting rib is connected to the third edge surface.

5. The anti-icing structure of claim 4, wherein the heating assembly comprises:

an insulation pad in the shape of a strip connected to the third edge surface; and a heated pad in the shape of a strip attached to the insulation pad at a position corresponding to the second edge surface.

6. The anti-icing structure of claim 5, wherein the insulation pad and the heated pad bonded to each other are disposed between the connecting ribs.

7. The anti-icing structure of claim 6, wherein an air gap is formed between the heated pad and the second edge surface within the connecting ribs.

8. The anti-icing structure of claim 5, further comprising:

a sealing member secured to either the opening edge face or the first edge surface facing each other.

9. The anti-icing structure of claim 8, wherein the sealing member comprises:

a sealing strip attached to the opening edge face.

10. The anti-icing structure of claim 8, wherein the sealing member comprises:

a heat transfer pad adhered to the first edge surface to transfer heat emitted from the heated pad to the opening edge face.

11. The anti-icing structure of claim 5, wherein:

the heated pad is disposed to be spaced apart at predetermined intervals along the width direction, and includes a plurality of hot wire patterns formed along the strip direction; and each of the plurality of hot wire patterns includes a linear pattern and a waveform pattern connected to each other.

12. The anti-icing structure of claim 11, wherein each of the linear pattern and waveform pattern of the plurality of hot wire patterns is formed with different section distances.

13. The anti-icing structure of claim 5, wherein the door inner cover further comprises:

a terminal insert portion formed on the inner side of the door inner cover and into which a terminal block electrically connected to the heated pad through a wire is fitted.

14. The anti-icing structure of claim 4, wherein the connecting rib is bonded to the third edge surface of the door outer cover by adhesive.

15. The anti-icing structure of claim 4, further comprising:

at least one air exhaust passage formed in the door inner cover and the door outer cover connected to each other.

16. The anti-icing structure of claim 15, wherein at least one air exhaust passage includes an air exhaust hole formed in the connecting rib.

17. The anti-icing structure of claim 5, wherein the heated pad comprises:

a plurality of hot wire patterns disposed at predetermined intervals along the width direction and formed along the strip direction; and a hot wire holding side connected to each end of the plurality of hot wire patterns respectively.

* * * * *